(12) United States Patent
Yoshida et al.

(10) Patent No.: US 7,969,567 B2
(45) Date of Patent: Jun. 28, 2011

(54) METHOD AND DEVICE FOR DETECTING SHAPE OF SURFACE OF MEDIUM

(75) Inventors: Minoru Yoshida, Yokohama (JP);
Takenori Hirose, Yokohama (JP);
Hideaki Sasazawa, Yokohama (JP);
Shigeru Serikawa, Chigasaki (JP)

(73) Assignee: Hitachi High-Technologies Corporation, Tokyo (JP)

( * ) Notice: Subject to any disclaimer, the term of this patent is extended or adjusted under 35 U.S.C. 154(b) by 197 days.

(21) Appl. No.: 12/482,125

(22) Filed: Jun. 10, 2009

(65) Prior Publication Data
US 2010/0085855 A1    Apr. 8, 2010

(30) Foreign Application Priority Data

Oct. 3, 2008   (JP) .................................. 2008-258833

(51) Int. Cl.
*G01N 21/00* (2006.01)
(52) U.S. Cl. ................ 356/237.2; 356/237.3; 356/237.4
(58) Field of Classification Search ..... 356/237.1–237.5
See application file for complete search history.

(56) References Cited

U.S. PATENT DOCUMENTS 6,493,076 B1 * 12/2002 Laitinen ..................... 356/237.2
2006/0192949 A1 * 8/2006 Bills et al. .................. 356/237.2

FOREIGN PATENT DOCUMENTS

JP    2007-133985    5/2007

* cited by examiner

*Primary Examiner* — Michael P Stafira
(74) *Attorney, Agent, or Firm* — Foley & Lardner, LLP

(57) ABSTRACT

A defect generated during a nano-imprint process is inspected by a scatterometry method. The scatterometry method is to illuminate the surface of a medium with light having a plurality of wave lengths by means of a first illuminator through a half mirror and an objective lens and cause light reflected on the medium to be incident on a spectrometer through the objective lens and the half mirror. A second illuminator illuminates a foreign material or scratch on the surface of the medium from an oblique direction with respect to the surface of the medium. Light is scattered from the foreign material or scratch and detected by first and second detectors. The first detector is placed in a direction defining a first elevation angle with the surface of the medium. The second detector is placed in a direction defining a second elevation angle with the surface of the medium. When coordinates of a defect that are obtained by the scatterometry method match coordinates of the foreign material or scratch, an inspection device determines that the defect is not generated during the nano-imprint process. When the matching is negative, the inspection device determines that the defect is generated during the nano-imprint process.

13 Claims, 12 Drawing Sheets

METHOD AND DEVICE FOR DETECTING SHAPE OF SURFACE OF MEDIUM

CLAIM OF PRIORITY

The present application claims priority from Japanese Patent Application JP 2008-258833 filed on Oct. 3, 2008, the content of which is hereby incorporated by reference into this application.

BACKGROUND OF THE INVENTION

1. Field of the Invention

The present invention relates to a method and device for optically detecting the shape of the surface of a magnetic medium, the shape of the surface of a semiconductor wafer or the like. The invention relates more particularly to an inspection technique for detecting whether or not a data island that is arranged in the pattern formed on the surface of the medium and is finer than optical resolution is present or whether or not the shape of the data island is good, and detecting a foreign material or a scratch on the surface of the medium from the single illuminated region in a single process to detect whether or not the data island is present and whether or not the shape of the data island is good with high sensitivity and output or display the result of the detection.

2. Description of the Related Art

A medium composed of a (glass or aluminum) substrate and a magnetic material (deposited on the surface of the substrate) is used as a magnetic recording medium used in a magnetic hard disk storage device. The medium is magnetized by a magnetic head to ensure that data is magnetically recorded on the medium. The recording is performed on each of recording regions of the medium. Each of the recording regions corresponds to one bit that is a recording unit.

A medium used in a current recording format has a magnetic film formed on the entire surface thereof. A data region (corresponding to a recording region) and a servo region (in which a signal serving as a standard for a magnetic head is written) are written on the medium by a servo track writer. In order to increase a recording density of the medium, it is necessary to reduce an area of the data region per bit. When the recording area is reduced, however, an effect called heat fluctuation (causing reversal of a magnetic orientation due to heat) occurs. Thus, the increase in the recording density is limited.

In order to solve the above problem, the structure of the magnetic film, sensitivity of the magnetic head and the like has been improved. However, the increase in the recording density is limited. In recent years, a patterned medium has been expected as a recording medium to further increase the recording density. The patterned medium has thereon an array of magnetic structures each corresponding to one-bit recording information.

Two types of patterned media have been proposed until now: one is a discrete track medium shown in FIG. 2A; and the other is a bit patterned medium shown in FIG. 2B. The discrete track medium has a substrate 1000 and data islands (track pattern portions) 1001. The data islands 1001 are arranged in a concentric track pattern on the substrate 1000. A magnetic film is not present between the data islands 1001 arranged in the track pattern. This configuration reduces occurrence of a magnetic mutual interference between tracks of the medium. Thus, the discrete track medium has a reduced data region and an increased recording density compared with conventional media.

The bit patterned medium has a substrate 1000 and a large number of data islands (bit pattern portions) 1002. The data islands 1002 are formed by dividing data islands arranged in such a track pattern as shown in FIG. 2B in longitudinal direction of the data islands and are arranged in a pattern on the substrate 1000. Each of the data islands 1002 of the bit patterned medium stores one-bit data. Thus, the bit patterned medium has a further reduced data region and a significantly increased recording density compared with conventional media. The width of each of the data islands 1001 of the track pattern and the width of each of the data islands 1002 of the bit pattern are several ten nanometers. The two types of patterned media are known techniques.

A nano-imprint technique is a promising approach to form patterns in those media. FIGS. 3-1 to 3-6 show a process flow for forming a pattern using a nano-imprint technique.

(1) A mold 1003 is placed above a resist 1004 coated on the surface of a medium 1000. (2) The mold 1003 comes into contact with the resist 1004 and is pressed toward the resist 1004 to transform the resist 1004. (3) In this state, the resist 1004 is exposed to light coming from the side of the mold 1003. (4) The mold 1003 is removed, and the same pattern as that of the mold 1003 is formed in the resist 1004. (5) Portions of the medium 1000 on which the resist 1004 is not present are etched using a semiconductor lithography technique. (6) The resist 1004 is removed, and a bit pattern is formed in the medium 1000.

When the mold 1003 has a defect or a foreign material attached thereto, the transferred pattern may include a pattern failure or a fatal defect such as a lack of a data island. It is, therefore, necessary to inspect whether or not the bit pattern is appropriately formed.

Even when the bit pattern is normally formed using the nano-imprint technique, a foreign material attached after the nano-imprint process or a scratch generated after the nano-imprint process may impact the result of the inspection of the bit pattern. It is, therefore, necessary to determine whether or not a pattern failure is caused by a defect generated during the nano-imprint process or caused by a foreign material attached after the nano-imprint process or by a scratch generated after the nano-imprint process and to inspect the bit pattern with high sensitivity.

There is a scatterometry method in order to efficiently inspect a patterned medium formed by such a nano-imprint technique. JP-A-2007-133985 describes a technique for inspecting a patterned medium by means of the scatterometry method.

SUMMARY OF THE INVENTION

In a method for detecting a defect on a pattern formed by a nano-imprint technique, a scanning electron microscope (SEM) or an atomic force microscope (AFM) may be used. When the SEM is used, however, only upper portions of data islands arranged in the pattern can be inspected. In order to inspect cross sections of the data islands arranged in the pattern, it is necessary that the data islands arranged in the pattern be broken.

On the other hand, although the AFM can measure a three-dimensional pattern, the result of the measurement may vary depending on the condition of a probe of the AFM. Thus, the AFM may not accurately measure the pattern. From the perspective of throughputs of the microscopes, all surfaces of each of all media cannot be inspected by these methods. When a microscope having a limited throughput attempts to inspect a target medium, only a limited region of the target medium can be inspected.

For the purpose of management of a nano-imprint process, it is necessary to accurately measure the shapes of data islands arranged in an imprinted pattern. For the purpose of management of the qualities of products, it is necessary to inspect all surfaces of each of all the products. These requirements cannot be satisfied by the aforementioned methods.

A challenge of the present invention is to solve the problems.

The present invention is devised to solve the various problems. An optical technique using a spectral reflection factor is used to detect a defect during a nano-imprint process. The optical technique is thus used to determine whether or not a data island arranged in a pattern is present and whether or not the shape of the data island is good. In addition, a detection technique is used to detect light scattered from a target region illuminated with a laser beam from an oblique direction and thereby to determine whether or not a foreign material or a scratch is present in the target region. Since the light coming from a single illuminated region is detected by detectors in a single process, the foreign material or the scratch can be specified. The present invention provides a method and device for detecting a defect present on the surface of a medium by detecting whether or not a data island arranged in a pattern is present and whether or not the shape of the data island is good with high sensitivity during a nano-imprint process and outputting or displaying the result of the detection.

The present invention realizes the surface defect detection method and device, which are capable of detecting a defect generated during a nano-imprint process with high sensitivity and without an impact of a foreign material attached after the nano-imprint process and an impact of a scratch generated after the nano-imprint process. Specific means are as follows.

According to the present invention, in a method for detecting a defect on a surface of a substrate having a pattern, a portion of the surface of the substrate rotating and moving in a single axial direction is illuminated with light having a plurality of wavelengths. Then, an intensity of light reflected on the surface of the substrate is detected for each wavelength. Based on data on the detected intensities, whether or not a data island arranged in the pattern is present in the illuminated portion of the surface of the substrate or whether or not the shape of the data island is good. In addition, the portion of the surface of the substrate is illuminated with laser light. Light scattered at a first elevation angle with respect to the surface of the substrate and from the portion of the surface of the substrate illuminated with the laser light, and light scattered at a second elevation angle with respect to the surface of the substrate and from the portion of the surface of the substrate illuminated with the laser light, are detected to obtain a first scattered light detection signal based on the light scattered at the first elevation angle and detected, and to obtain a second scattered light detection signal based on the light scattered at the second elevation angle and detected. The first and second scattered light detection signals are processed to detect a defect such as a foreign material or a scratch, which is present on the portion of the surface of the substrate. It is confirmed whether or not coordinates of a defect detected by the illumination with the light having the plurality of wavelengths match coordinates of the defect detected by the illumination with the laser light based on information obtained in the step of detecting whether or not the data island is present in the illuminated portion of the surface of the substrate or whether or not the shape of the data island is good and on information obtained in the step of detecting the defect such as a foreign material or a scratch present on the portion of the surface of the substrate. When the sets of coordinates match each other, processing is performed to remove information indicating the defect detected at the location corresponding to the coordinates and obtained in the step of detecting whether or not the data island is present in the illuminated portion of the surface of the substrate or whether or not the shape of the data island is good. When the sets of coordinates do not match each other, the information obtained in the step of detecting whether or not the data island is present in the illuminated portion of the surface of the substrate or whether or not the shape of the data island is good is used; the processing result of the information obtained in the step of detecting whether or not the data island is present on the illuminated portion of the surface of the substrate or whether or not the shape of the data island is good is combined with the processed result of the information obtained in the step of detecting the defect causing the light to be scattered to detect the defect as an actual defect present on the surface of the substrate. According to the present invention, a device for detecting a defect on a surface of a substrate having a pattern includes: a table for mounting thereon the substrate, rotating the substrate and moving the substrate in a single axial direction; a first illuminator for illuminating, with light having a plurality of wavelengths, the surface of the substrate mounted on the table and rotating and moving in the single axial direction; a second illuminator for illuminating the surface of the substrate with laser light from an oblique direction with respect to the surface of the substrate; a reflected light detector for detecting the intensity of the light reflected on the substrate illuminated by the first illuminator for each wavelength; a first scattered light detector for detecting light scattered at a first elevation angle with respect to the surface of the substrate and from the substrate illuminated with the laser light by the second illuminator; a second scattered light detector for detecting light scattered at a second elevation angle with respect to the surface of the substrate and from the substrate illuminated with the laser light by the second illuminator; substrate surface shape processing means for processing defect information received from the reflected light detector; defect signal processing means for processing detection signals received from the first and second scattered light detectors and detecting a defect present on the surface of the substrate; defect information processing means for extracting only information received from the substrate surface shape processing means from information obtained by the processing performed by the substrate surface shape processing means and information obtained by the processing performed by the defect signal processing means; and means for displaying and storing information obtained by the defect information processing means, wherein the substrate surface shape processing means detects the shape of the surface of the substrate; the defect signal processing means detects the defect present on the surface of the substrate; the defect information processing means extracts only the information indicating the defect present on the surface of the substrate; and the information indicating the defect is displayed and stored based on the information extracted by the defect information processing means.

These and other objects, features and advantages of the invention will be apparent from the following more particular description of preferred embodiments of the invention, as illustrated in the accompanying drawings.

BRIEF DESCRIPTION OF THE DRAWINGS

FIGS. 3-1 to 3-6 are schematic diagrams showing a process for forming a patterned medium by means of a nano-imprint technique.

FIG. 4 is a cross sectional view of the medium according to the first embodiment, which has defects.

FIG. 5 is a top view of the medium according to the first embodiment, which has the defects.

DETAILED DESCRIPTION OF THE PREFERRED EMBODIMENTS

Embodiments of the present invention are described below in detail.

Figure 1:
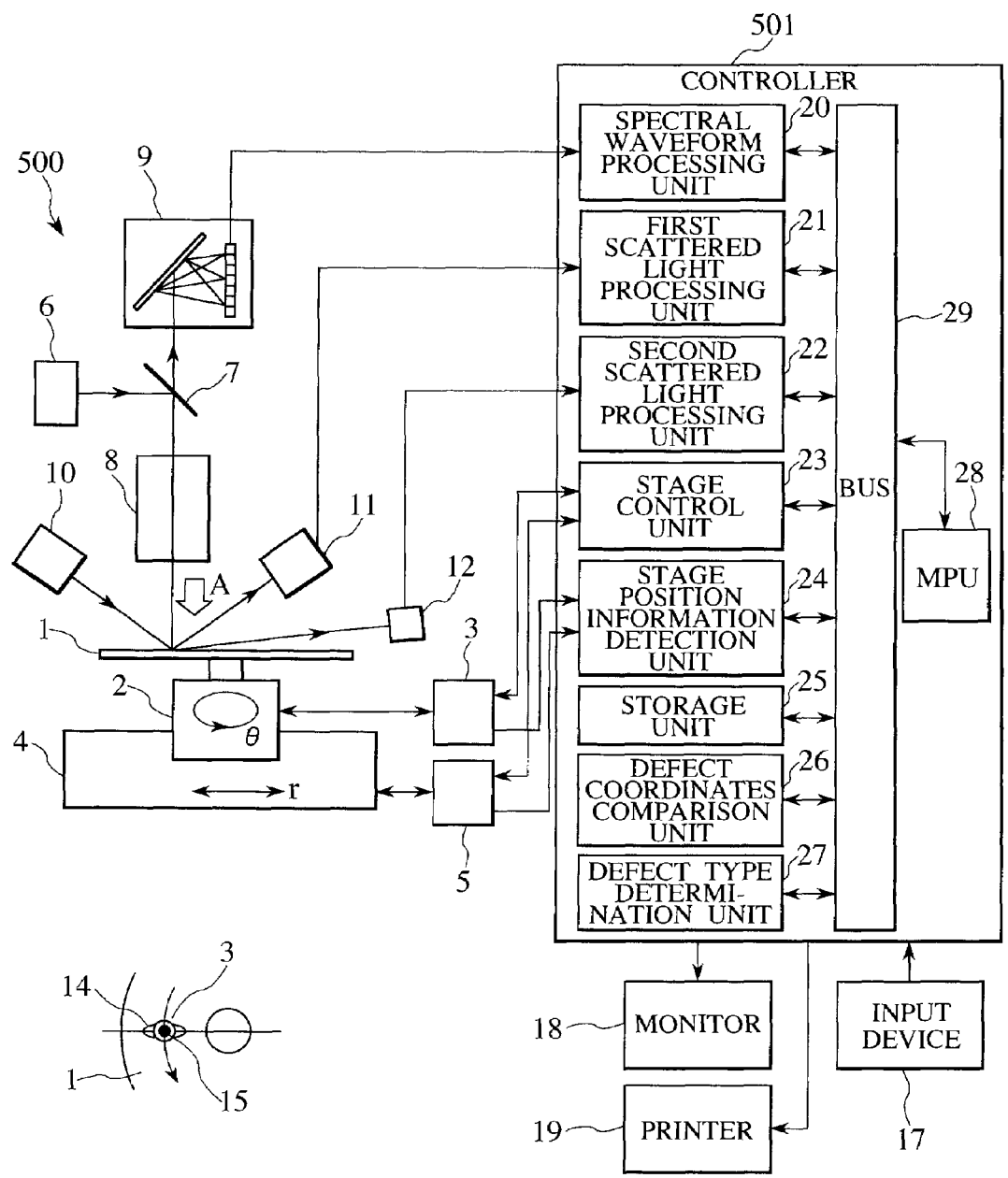
FIG. 1 is a front view of a device for detecting a defect on the surface of a medium according to a first embodiment of the present invention.
Figures 2A, 2B:
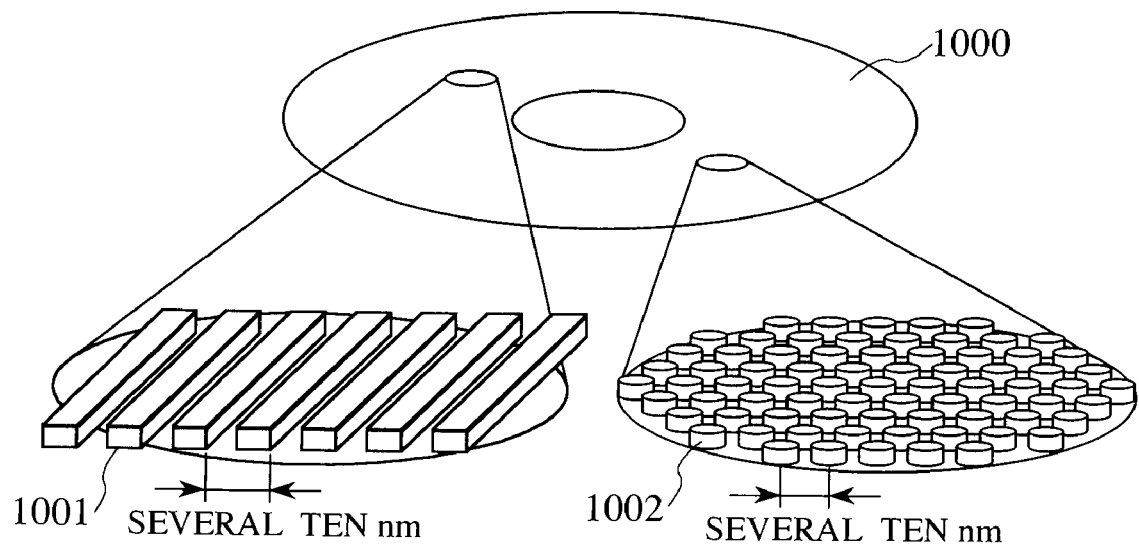
FIG. 2A is a diagram showing the shape of a discrete track medium.
FIG. 2B is a diagram showing the shape of a bit patterned medium.

FIGS. 1 and 4 to 16 show a device for detecting the shape of the surface of a medium according to the first embodiment of the present invention. Reference numeral 500 denotes the detection device in FIG. 1. FIG. 1 shows the configuration of the detection device 500. A medium 1 is fixed to a rotary stage 2. A rotary stage control unit 3 controls a rotation of the rotary stage 2 and is capable of detecting the position of the rotary stage 2 in the rotating direction. The rotary stage 2 can be moved by a translation stage 4 in a horizontal direction. A translation stage control unit 5 controls the amount of the horizontal movement of the translation stage 4 and is capable of detecting the position of the translation stage 4.

A first illuminator 6 (e.g., halogen lamp, xenon lamp or the like) emits light having a plurality of wavelengths. The light is reflected on a half mirror 7, passes through an objective lens 8 and reaches the surface of the medium 1. A halogen lamp, a xenon lamp or the like is used for an optical source of the first illuminator 6. The light is reflected on the surface of the medium 1, passes through the objective lens 8 and the half mirror 7 again, and is incident on a spectrometer 9.

The spectrometer 9 may be a commercial spectrometer made by Carl Zeiss, Inc., a commercial spectrometer made by Hamamatsu Photonics K.K. or the like. The spectrometer 9 may be applied to the detection device 500, while the spectrometer 9 is separated by approximately 200 nanometers from the medium 1. A second illuminator 10 emits a laser beam from an oblique direction with respect to an upper surface of the medium 1. A first detector 11 is placed in a direction defining a first elevation angle with respect to the upper surface of the medium 1 and located on the side opposite to the side on which the second illuminator 10 emits the light. The first detector 11 can detect only light scattered from the medium 1. A second detector 12 is placed in a direction defining a second elevation angle with respect to the upper surface of the medium 1. The second detector 12 can detect light scattered from the medium 1 and different from the scattered light detected by the first detector 11.

A photoelectric transducer, a photomultiplier or a camera is used for each of the first and second detectors 11 and 12. A region of the upper surface of the medium 1, which is illuminated with the light, is illustrated in A fragmentary view when viewed from the side of the objective lens 8. The first and second illuminators 6 and 10 are placed to ensure that a region 13 illuminated by the first illuminator 6 matches a region 14 illuminated by the second illuminator 10. In this case, the region 13 is used as a standard. In addition, the spectrometer 9 and the first and second detectors 11, 12 are placed to ensure that a region 15 from which the spectrometer 9 detects light matches a region from which the first detector 11 detects light and a region from which the second detector 12 detects light.

The second illuminator 10 is placed in a direction defining an angle of more than zero degrees with respect to the upper surface of the medium 1 (and in a direction other than the circumferential direction of the medium 1). In the first embodiment, the second illuminator 10 is placed in a direction defining an angle of 20 degrees to 30 degrees with respect to a normal to the upper surface of the medium 1. The first detector 11 is placed symmetrically to the second illuminator 10 with respect to the normal to the upper surface of the medium 1 to be placed in a direction in which the light emitted by the second illuminator 10 is specularly reflected.

The second detector 12 is placed in a direction defining a low angle with respect to the upper surface of the medium 1 and located outside a region in which the light that can be detected by the first detector 11 propagates. In the first embodiment, the second detector 12 is placed in a direction defining an angle of 70 degrees to 80 degrees with respect to the normal to the upper surface of the medium 1. A controller 501 performs processing on data transmitted from the detectors and controls the stages. In addition, the controller 501 inputs data on detection conditions. Furthermore, the controller 501 displays or prints the detection results.

The controller 501 has a spectral waveform processing unit 20, a first scattered light processing unit 21, a second scattered light processing unit 22, a stage control unit 23, a stage position information detection unit 24, a storage unit 25, a defect coordinates comparison unit 26, a defect type determination unit 27, a micro processing unit (MPU) 28, a bus 29, an input device 17, a monitor 18 and a printer 19. The spectral waveform processing unit 20 processes a signal (detection result) output from the spectrometer 9 and including multiple wavelengths. The first scattered light processing unit 21 processes a signal (detection result) indicating the scattered light detected by the first detector 11. The second scattered light processing unit 22 processes a signal (detection result) indicating the scattered light detected by the second detector 12. The stage control unit 23 controls the rotary stage control unit 3 and the translation stage control unit 5. The stage position information detection unit 24 receives information on the position of the rotary stage 2 and information on the position of the translation stage 4. The storage unit 25 stores the detection result transmitted from the spectral waveform processing unit 20, the detection result transmitted from the first scattered light processing unit 21, the detection result transmitted from the second scattered light processing unit 22, and the positional information transmitted from the stage position information detection unit 24. The defect coordinates comparison unit 26 compares the defect results (defect information) stored in the storage unit 25 with the positional information stored in the storage unit 25. The defect type determination unit 27 determines the type of the defect based on the result of the processing performed by the defect coordinates comparison unit 26. The MPU 28 performs calculation processing. The bus 29 connects each of the units 20 to 27 with the MPU 28. The input device 17 inputs data on detection conditions. The monitor 18 displays the input results, the detection results of the defect and the like. The printer 19 outputs the detection results.

Figures 1, 3:
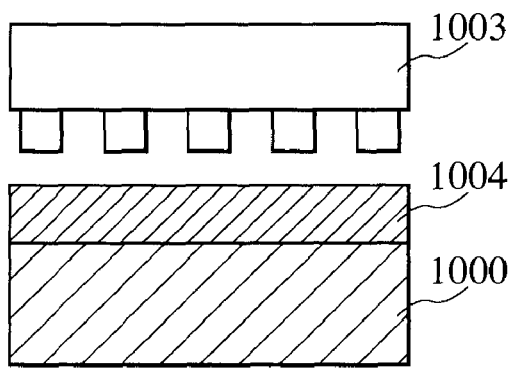
Figures 3, 4:
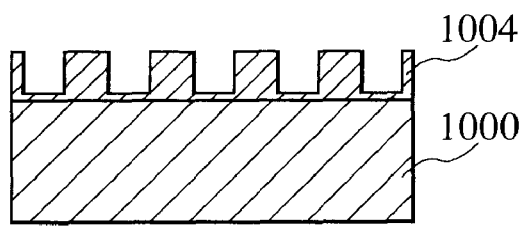
Figures 2, 3:
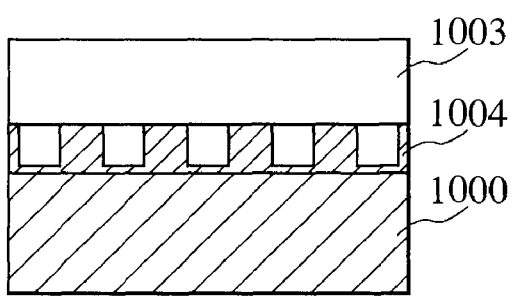

FIG. 4 shows the types of main defects present on the medium. In FIG. 4, a magnetic head section 70 has a magnetic head (magnetic element) 71 at its edge. The magnetic head 71 reads and writes data from and on the medium 1 under the condition that the medium 1 and the magnetic head 71 are not in contact with each other. A gap between the magnetic head 71 and the medium 1 during the reading and writing is called a flying height. In techniques developed in recent years, the gap has been reduced and is now set to less than 10 nanometers. A defect present on the medium and smaller than the flying height is not a problem. However, a defect larger than the flying height may cause the magnetic head 71 to fall.

Figures 3, 4, 5:
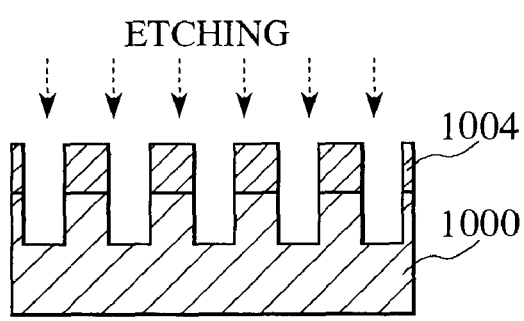
Figure 3:
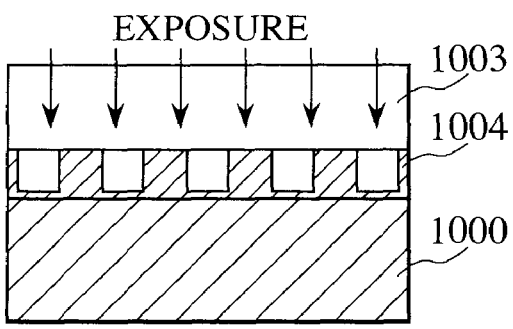
Figures 3, 4, 5, 6:
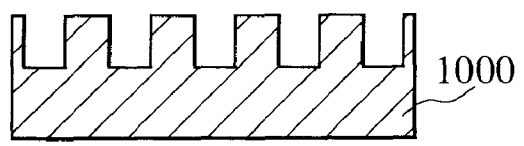
Figure 4:
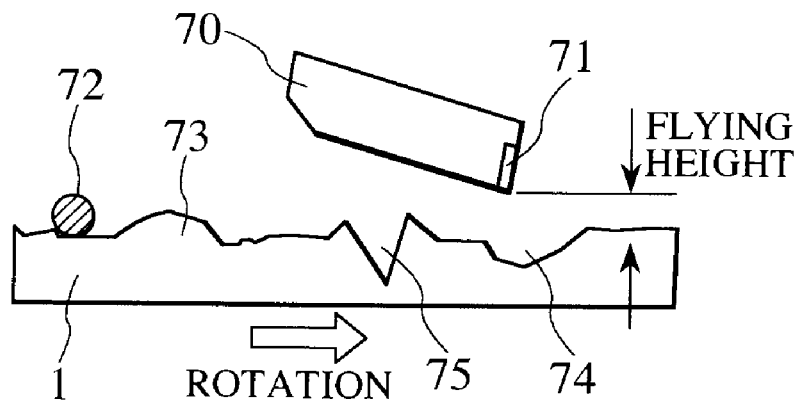
Figure 5:
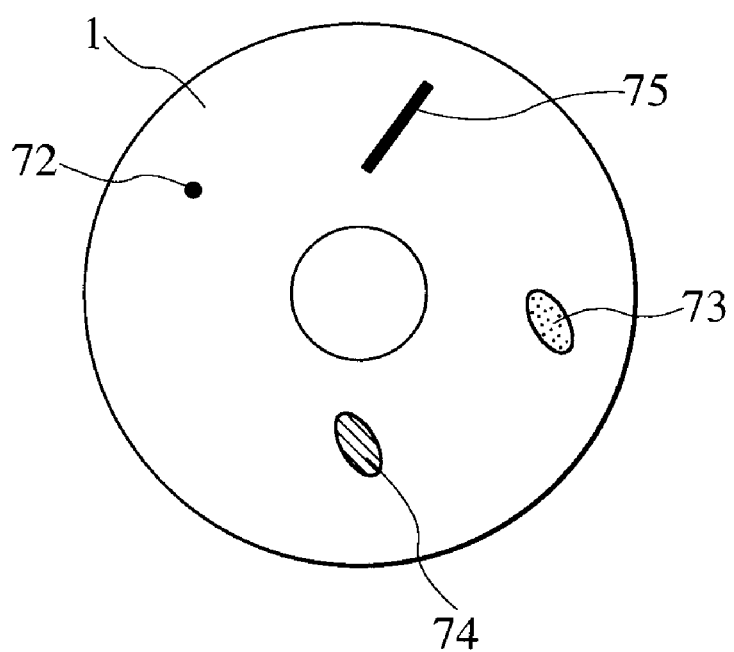

FIG. 5 is a top view of the medium 1. A foreign material 72 is attached to the surface of the medium 1 and may interfere with the magnetic head 71. The medium 1 is cleaned before the medium 1 is set in a magnetic hard disk device. Most of foreign materials are washed away, and there is no problem with the medium 1 in many cases. A void defect 73 projecting from the surface of the medium 1, a pit defect present on the surface of the medium 1, and the like, have large areas (of approximately 1 mm$^2$) and small depths (of approximately several nanometers to several ten nanometers) in many cases. In such cases, the defects form a gentle irregularity, and the magnetic head 71 can easily track the medium 1. However, a deposition failure may easily occur during deposition of a magnetic material or the like, and may thereby heavily cause a recording failure or the like.

A scratch 75 is a defect caused by the fact that an abrasive falls on the surface of the medium 1 during a polishing process for flattening the surface of the medium 1. The scratch 75 has a long, narrow shape or has a short shape. The scratch 75 has a dent portion and a sharply projecting portion. The scratch 75 interferes with the magnetic head 71 and may cause a fatal failure.

It is, therefore, necessary that the detection device be used to detect such defects during an early process and remove a medium having the defects as a defective product. Cross sections of the defects are roughly shown in FIG. 4. Such defects may be generated in patterned media. Defects specific to the patterned media are a lack of a data island and a shape failure. The lack of a data island and a shape failure occur during an imprint process. In order to detect a defect during the imprint process with high sensitivity, it is necessary to distinguish between defects generated during formation of a pattern and defects generated during a process performed after the pattern formation.

Next, operations of each of the parts included in the detection device 500 are described below. In the configuration shown in FIG. 1, the rotary stage 2 rotates while mounting thereon the medium 1. The rotation of the rotary stage 2 is controlled by the rotary stage control unit 3. The translation stage 4 moves in a horizontal direction. The amount of the horizontal movement of the translation stage 4 is controlled by the translation stage control unit 5. The translation stage 4 moves only a distance equal to the width of a spot of the illumination light for each rotation of the rotary stage 2.

The first illuminator 6 illuminates a portion of the surface of the rotating medium 1, and the spectrometer 9 detects light reflected on the portion of the surface of the rotating medium 1. The spectrometer 9 outputs a signal to the spectral waveform processing unit 20 based on the detected light. The output signal is processed by the spectral waveform processing unit 20. The spectral waveform processing unit 20 determines the shape of the illuminated portion of the surface of the medium 1. Data on the coordinates of the illuminated portion is stored in the storage unit 25.

A method for optically detecting the shape of a data island arranged in the pattern by means of the spectrometer 9 is described below. The patterned medium, which is a main target to be inspected according to the present invention, has periodically arranged data islands of several ten nanometers on the medium. In this case, when any of the heights, widths or the like of the data islands changes, a spectral reflection factor of the entire surface on which the data islands are present changes.

When a certain data island is different in shape from the other data islands, a spectral reflection factor of the certain data island is also different from those of the other data islands. Thus, the shape of a target data island can be detected by detecting a spectral reflection factor of the target data island. In order to detect the shapes of such periodically arranged fine data islands, a scatterometry is used. For example, an electromagnetic wave analysis technique such as a rigorous coupled-wave analysis (RCWA) can be used to calculate a spectral reflection factor of a target data island (to be inspected) based on the optical constant of the shape of the data island and the optical constant of a material of the data island.

Values representing the shapes of data islands, such as the heights, widths and the like of the data islands, are used as parameters. Reflection factors of data islands that are to be inspected and have different parameters are calculated in advance. A reflection factor of a target data island from which light is actually detected by the spectrometer 9 is compared with the calculated reflection factors. The closest calculated reflection factor to the reflection factor of the target data island is extracted to detect the shape of the target data island. Alternatively, the reflection factor of the target data island from which the light is actually detected by the spectrometer 9 is fitted to a reflection factor calculated by the RCWA or the like using values (such as the heights, widths and the like of data islands) representing the shapes of the data islands as parameters. Then, the shape of the target data island can be detected.

Figure 6A:
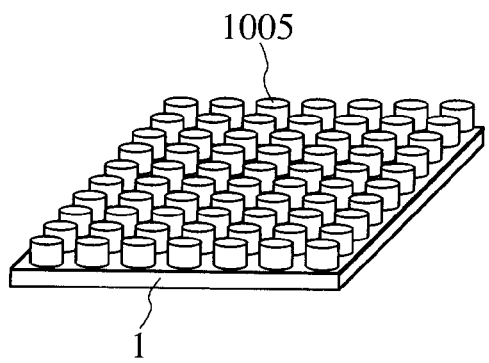
FIG. 6A is a diagram showing a bit patterned medium imprinted and remaining in its normal state.
Figure 6B:
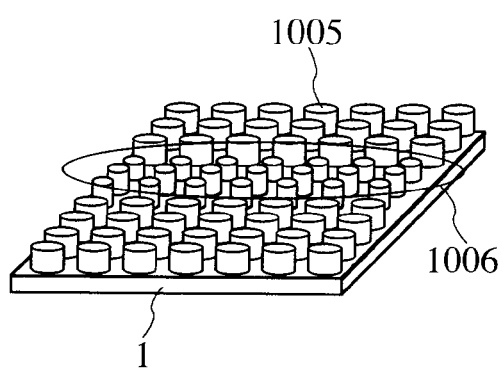
FIG. 6B is a diagram showing a bit patterned medium imprinted and including central data islands having heights different from those of other data islands.
Figure 6C:
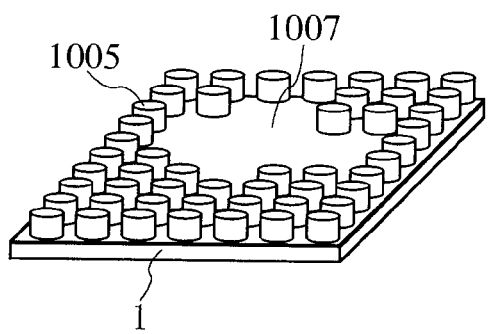
FIG. 6C is a diagram showing a bit patterned medium having a region in which there is no data island.

A description is made of a method for detecting a failure of the pattern imprinted on the medium based on the result of the processing performed using the aforementioned principle. FIGS. 6A to 6C are perspective views of imprinted bit patterns. FIG. 6A shows the normal pattern. FIG. 6B shows the pattern that includes a data island located at a central region of the pattern and having a height different from other data islands arranged in the pattern. In addition, the pattern shown in FIG. 6B includes a data island located at the central region and having a diameter different from other data islands. FIG. 6C shows the pattern with a region in which a data island is not present.

Figure 8:
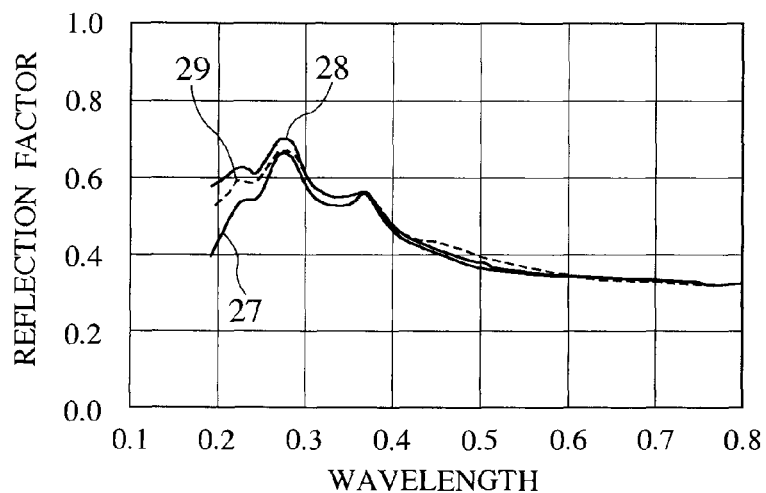
FIG. 8 is a graph showing a spectral waveform according to the first embodiment.

FIG. 8 is a graph showing an example of a signal output from the spectrometer 9 and illustrating a detected wavelength plotted along an abscissa axis and a reflection factor plotted along an ordinate axis. When the spectrometer 9 detects light reflected on the data island arranged in the normal pattern shown in FIG. 6A, the detected light exhibits a waveform 27. When the spectrometer 9 detects light reflected on the data island that is arranged in the pattern shown in FIG. 6B and located at the central region of the pattern, the detected light exhibits a waveform 29. When the spectrometer 9 detects light reflected on the region (shown in FIG. 6C) in which there is no data island, the detected light exhibits a waveform 28. That is, the detected reflection factor varies depending on the wavelength and on the shape of the data island. The spectral waveforms are different from each other. Thus, the shapes of the data islands arranged in the bit pattern can be measured.

Figure 7A:
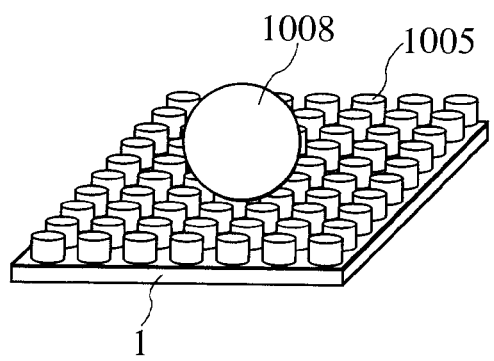
FIG. 7A is a diagram showing an example in which the bit patterned medium according to the first embodiment has a foreign material attached thereto.
Figure 7B:
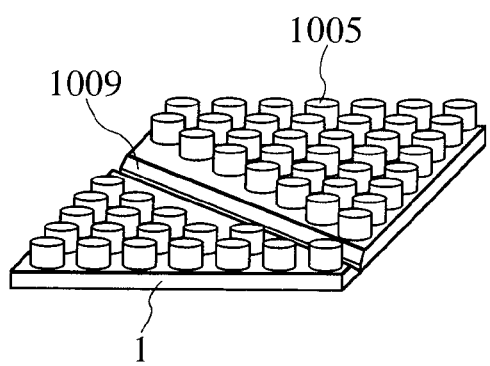
FIG. 7B is a diagram showing an example in which the bit patterned medium according to the first embodiment has a scratch thereon.

Next, a description is made of the fact that a defect generated after the formation of the bit pattern affects the spectral detection. FIGS. 7A and 7B are perspective views of defects that affect the spectral detection. FIG. 7A shows the case where a foreign material is attached to the surface of the medium 1 with the bit pattern formed thereon, while FIG. 7B shows the case where a scratch is present on the surface of the medium 1. In the state shown in FIG. 7A, when the spectrometer 9 attempts to detect the shape of a data island arranged in the pattern shown in FIG. 7A based on a spectral waveform as described above, the spectrometer 9 detects, as a shape failure, the region in which the foreign material is present. In the state shown in FIG. 7B, the spectrometer 9 detects the scratch as a lack of a data island(s). These defects are generated after the imprint process rather than before the imprint process in many cases. The defects are considered to affect the shape detection during the pattern formation process using the imprint technique.

Figure 9:
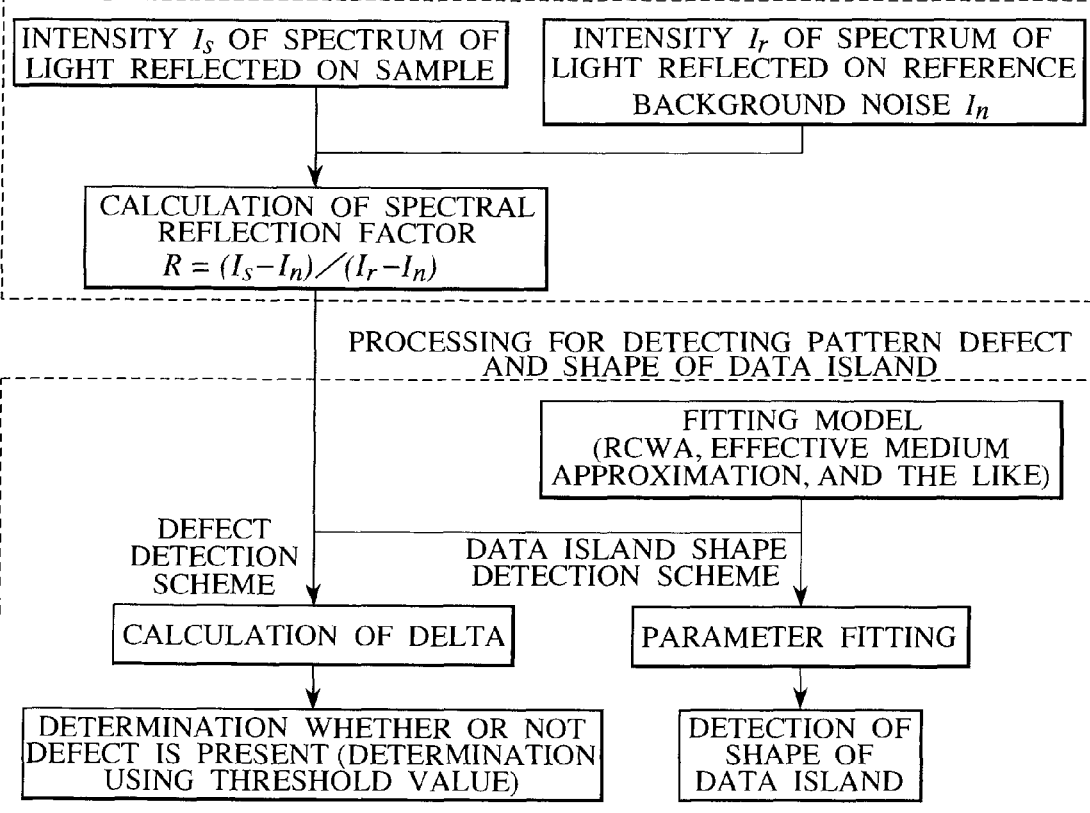
FIG. 9 is a flowchart of a process for determining whether or not a defect is present in a data island arranged in a pattern of the medium and calculating the shape of the data island arranged in the pattern based on a spectral waveform according to the first embodiment.

Next, a description is made of a method for determining the shape of a data island based on a spectral waveform. FIG. 9 is a flowchart of a process for detecting the shape of a data island based on a spectral waveform. The intensity (hereinafter referred to as reference spectral reflectance intensity) of a spectrum of light reflected on a reference (on which light is reflected and then has a spectrum whose intensity is stable) such as a silicon wafer is acquired in advance. In order to improve the accuracy of the detection, background noise is acquired under the condition that the medium 1 is not placed.

A spectral reflection factor is calculated based on the intensity of a spectrum of light reflected on the medium 1 and detected by the spectrometer 9, the reference spectral reflectance intensity and the background noise. Then, the calculated spectral reflection factor is compared with a fitting model. The fitting model is created by calculating a reflection factor of a target data island using values (the heights, widths and the like of data islands) representing the shapes of the data islands as parameters, or organizing results obtained by a simulation into a database as templates.

The spectral waveform detected by the spectrometer 9 is compared with the fitting model. Then, the shape of the template closest to the detected waveform is output as the shape of the detected waveform. The total amount (delta) of shifts of the detected waveform from a reference waveform is calculated. Then, the total amount of shifts of a waveform detected from the normal pattern from the reference waveform is set as a threshold value. A defect such as a lack of a data island arranged in the bit pattern is determined based on the threshold value. When a wavelength of the laser light emitted by the second illuminator 10 impacts the intensity of a spectrum of the light reflected on the medium 1, a wavelength range including the wavelength is removed to eliminate the impact.

Next, a description is made of a method for detecting a defect other than defects of data islands arranged in the pattern by illuminating the surface of the medium 1 by means of the second illuminator 10 and detecting light scattered from the surface of the medium 1 by means of the first and second detectors 11 and 12. First, the medium 1 is rotated in the same way as in the spectral detection. Then, the second illuminator 10 illuminates the surface of the rotating medium 1 with light from an oblique direction with respect to the surface of the medium 1.

When a defect is present on the surface of the medium 1, the light is reflected on the defect and scattered from the defect. Each of the first and second detectors 11 and 12 detects a component of the scattered light. Then, the first and second detectors 11 and 12 outputs signals to the first and second scattered light processing units 21 and 22 based on the detected light components, respectively. Each of the first and second scattered light processing units 21 and 22 determines whether or not the defect is regarded as an actual defect and determines the type of the defect. In addition, data on coordinates of the defect is stored in the storage unit 25.

Figure 10A:
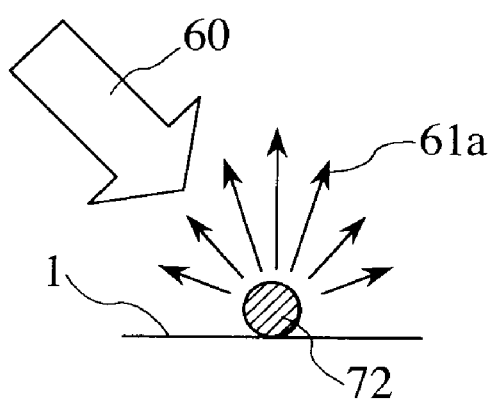
FIG. 10A is a diagram showing an example of light scattered from a foreign material present on the surface of the patterned medium when the medium is illuminated from an oblique direction with respect to the surface of the medium and from the left side of the drawing.
Figure 10B:
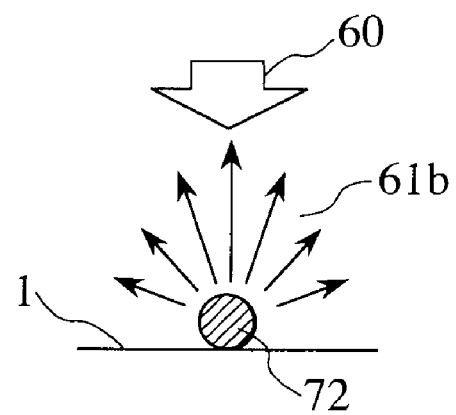
FIG. 10B is a diagram showing the example shown in FIG. 10A when viewed from a direction perpendicular to the direction from which the state shown in FIG. 10A is viewed.

FIGS. 10A to 14 show examples of light scattered from defects when the surface of the medium 1 is illuminated from an oblique direction with respect to the upper surface of the medium 1. FIGS. 10A and 10B show the case where a projecting defect (foreign material 72) is present on the surface of the medium 1. FIG. 10A shows the case where the surface of the medium 1 is illuminated from an oblique direction (and from the left side of the drawing). FIG. 10B shows the case shown in FIG. 10A when viewed from a direction perpendicular to the direction from which the state shown in FIG. 10A is viewed (or when viewed from the side opposite to the side from which illumination light 60 is incident on the upper surface of the medium 1). When the illumination light 60 is incident on the surface of the medium 1 from the oblique direction, light 61a, 61b is scattered from the foreign material 72. Light is almost symmetrically scattered from a projection such as the foreign material 72 in many cases. However, light may be exceptionally, asymmetrically scattered from the projection depending on the illumination condition and on the size of the projection.

Figure 11A:
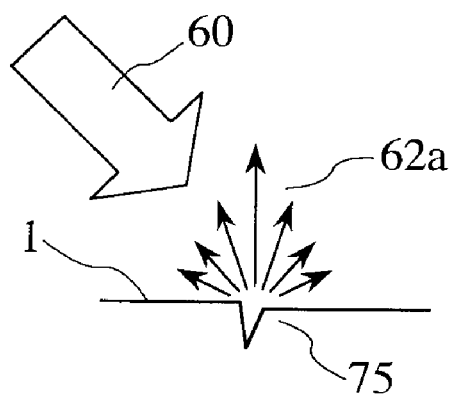
FIG. 11A is a diagram showing an example of light scattered from a scratch present on the surface of the patterned medium when the medium is illuminated from an oblique direction with respect to the surface of the medium and from the left side of the drawing.
Figure 11B:
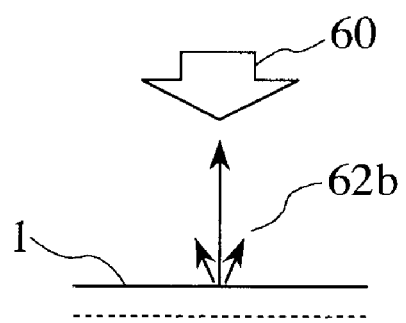
FIG. 11B is a diagram showing the example shown in FIG. 11A when viewed from a direction perpendicular to the direction from which the state shown in FIG. 11A is viewed.

FIGS. 11A and 11B show an example in which light is scattered from a scratch defect such as a scratch 75. FIG. 11A shows the case where the surface of the medium 1 is illuminated from an oblique direction with respect to the surface of the medium 1 (and from the left side of the drawing). FIG. 11B shows the case shown in FIG. 11A when viewed from a direction perpendicular to the direction from which the state shown in FIG. 11A is viewed (or when viewed from the side opposite to the side from which illumination light 60 is incident on the upper surface of the medium 1). When the illumination light 60 is incident on the surface of the medium 1 from the oblique direction, light 62a, 62b is scattered from the scratch 75. The intensity of the light scattered from the scratch 75 toward a direction perpendicular to a longitudinal direction of the scratch 75 is large. Also, the intensity of light reflected on the scratch 75 toward the direction perpendicular to the longitudinal direction of the scratch 75 is large. The intensity of the light scattered from the scratch 75 toward the longitudinal direction of the scratch 75 is small (a bottom of the scratch 75 is shown by a dotted line). Also, the intensity of the light reflected on the scratch 75 toward the longitudinal direction of the scratch 75 is small.

Figure 12:
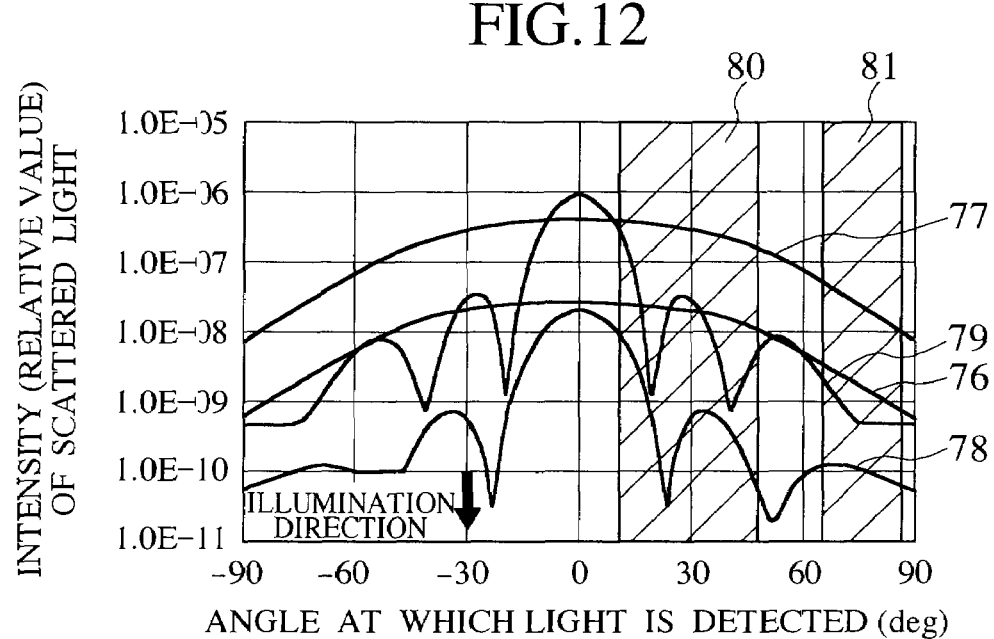
FIG. 12 is a graph showing detection signals (scattered light detection signals) indicating light scattered from defects present on the medium according to the first embodiment.

FIG. 12 is a graph showing a distribution of the light scattered toward the first detector 11. An abscissa axis of the graph indicates an angle at which the light is detected by the first detector 11. An ordinate axis of the graph indicates the relative value of the intensity of the scattered (detected) light. An angle at which the first illuminator 10 emits the light corresponds to the angle (at which the illumination light 60 is incident on the surface of the medium 1) shown in FIGS. 10A and 11A. A waveform 76 indicates the amount of light detected from a foreign material having a width of 200 nanometers, while waveform 77 indicates the amount of light detected from a foreign material having a width of 300 nanometers. A waveform 78 indicates the amount of light detected from a scratch having a width of 200 nanometers and a depth of 50 nanometers, while a waveform 79 indicates the amount of light detected from a scratch having a width of 300 nanometers and a depth of 50 nanometers. The first detector 11 detects the amount of light in an angle range 80 shown in FIG. 12, while the second detector 12 detects the amount of light in an angle range 81 shown in FIG. 12.

Figure 13:
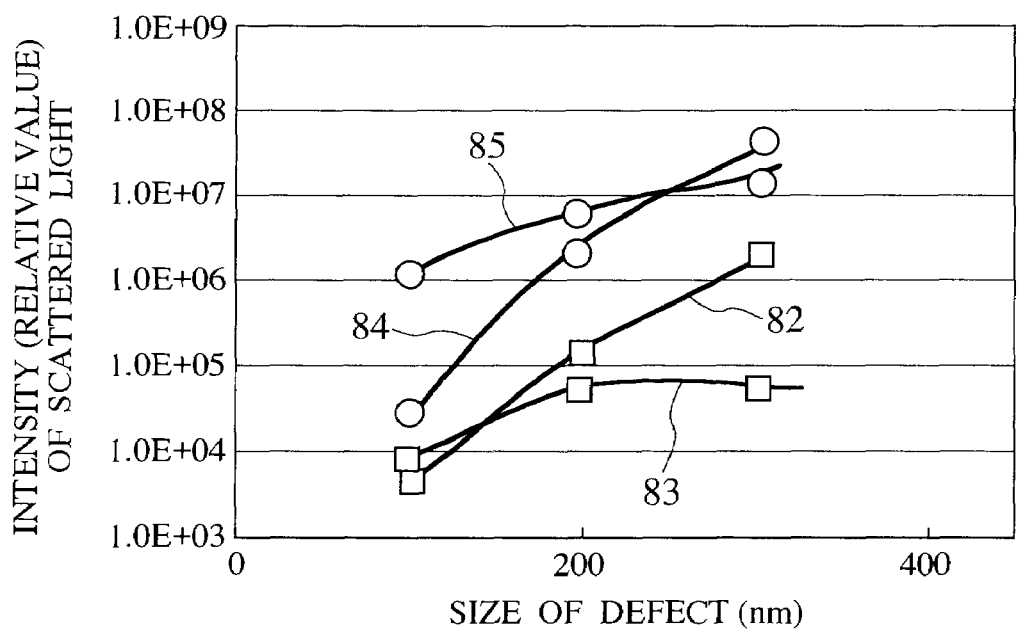
FIG. 13 is a graph showing scattered light detection signals indicating the light scattered from the defects present on the medium and detected by first and second detectors 11 and 12.

FIG. 13 is a graph showing the intensity of the detected light. An abscissa axis of the graph indicates the size of a defect, while an ordinate axis of the graph indicates (an relative value of) the intensity of the detected light. A waveform 82 indicates the amount of light detected from a foreign material in the angle range 81. A waveform 83 indicates the amount of light detected from a scratch in the angle range 81. A waveform 84 indicates the amount of light detected from a foreign material in the angle range 80. A waveform 85 indicates the amount of light detected from a scratch in the angle range 80. Comparing the amount of the light detected in the angle range 80 with the amount of the light detected in the angle range 81, the intensity of the light scattered from the scratch and detected in the angle range 81 is small. Thus, the amount of the light scattered from the scratch and detected in the angle range 81 is also small. Therefore, a foreign material and a scratch can be distinguished from each other by comparing the intensity of the light detected in the angle range 80 with the intensity of the light detected in the angle range 81.

The optical system of the detection device 500 is adjusted and the processing system of the detection device 500 performs control to ensure that the spectrometer 9 and the first and second detectors 11 and 12 detect light coming from the same region at the same time.

Figure 14:
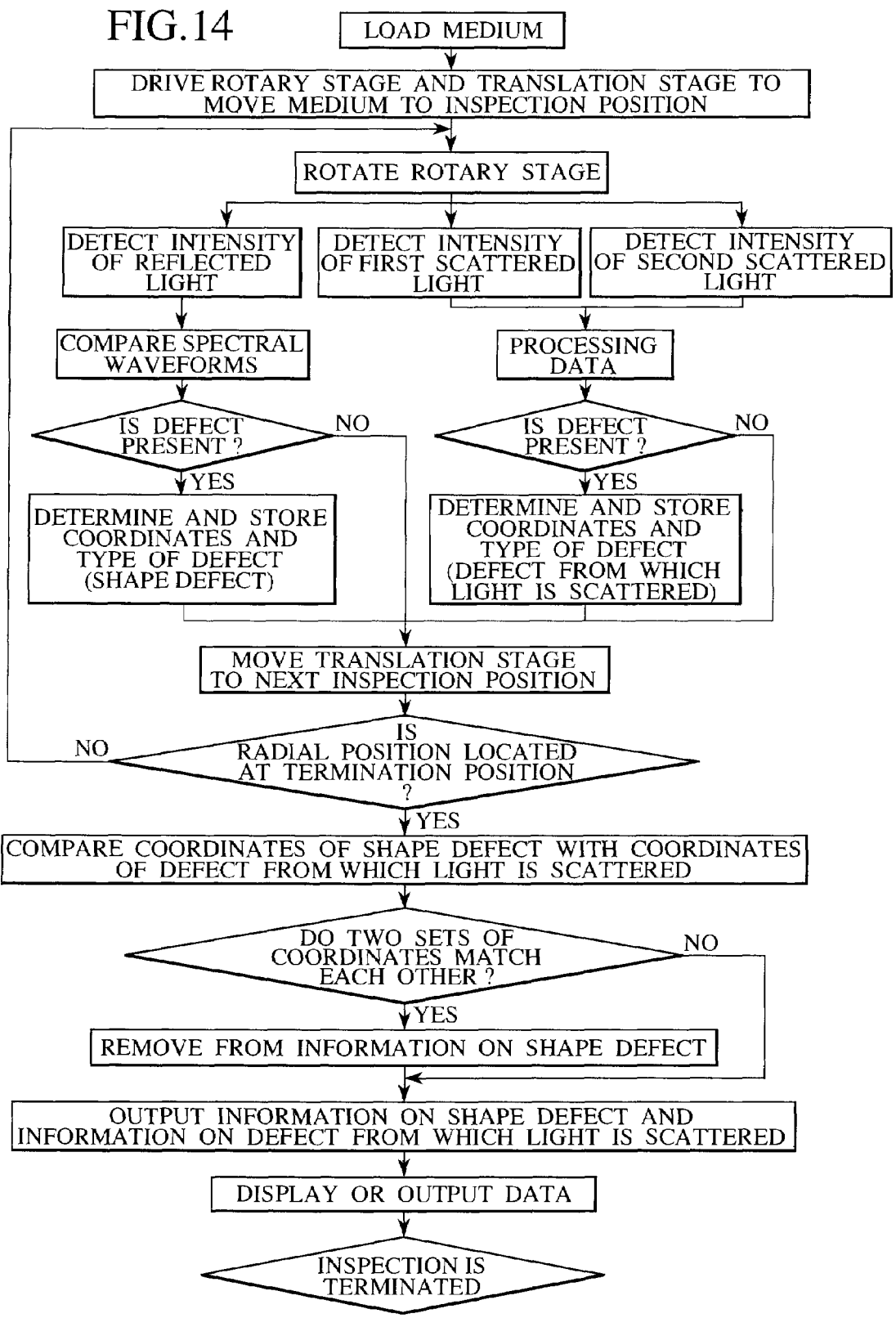
FIG. 14 is a flowchart of an inspection process according to the first embodiment.

FIG. 14 is a flowchart of a process for inspecting the shape of a portion of the surface of the medium 1 or the shape of a defect present on the surface of the medium 1. First, the medium 1 is loaded at a location at which the inspection starts. The stage position information detection unit 24 controls the rotary stage control unit 3 and the translation stage control unit 5 to move the medium 1 to a location at which the inspection is performed. While the rotary stage 2 is rotated by the rotary control unit 3, the spectrometer 9 detects the intensity of light reflected on the surface of the medium 1, and the first and second detectors 11 and 12 detect the intensities of light scattered from the surface of the medium 1, in the same process.

The spectral waveform processing unit 20, the first scattered light processing unit 21 and the second scattered light processing unit 22 perform data processing. When a defect exists, the information received by the stage position information detection unit 24, a defect type detected by the spectral waveform processing unit 20 and the first and second scattered light processing units 21 and 22 are stored in the storage unit 25. After the storage or when there is no defect, the translation stage 4 moves to the next inspection position based on preset inspection conditions. Then, the inspection restarts.

The aforementioned process is repeated. After termination of the inspection, information indicating the shape of a defect and processed by the spectral waveform processing unit 20 is compared with coordinates (of a defect from which light is scattered) calculated by the first scattered light processing unit 21 and coordinates (of a defect from which light is scattered) calculated by the second scattered light processing unit 22. When the information indicating the shape of the defect and processed by the spectral waveform processing unit 20 matches the coordinates calculated by the first and second scattered light processing units 21 and 22, processing is performed to ensure that the information (indicating the shape of the defect) processed by the spectral waveform processing unit 20 is not displayed in the inspection result. The following information is output and displayed or printed: information that is processed by the spectral waveform processing unit 20 and indicates the shape of a defect whose coordinates do not match the coordinates calculated by the first and second scattered light processing units; and information that indicates the shape of a defect from which light is scattered and is obtained by the first and second scattered light processing units 21 and 22. Then, the inspection is terminated.

Figure 15:
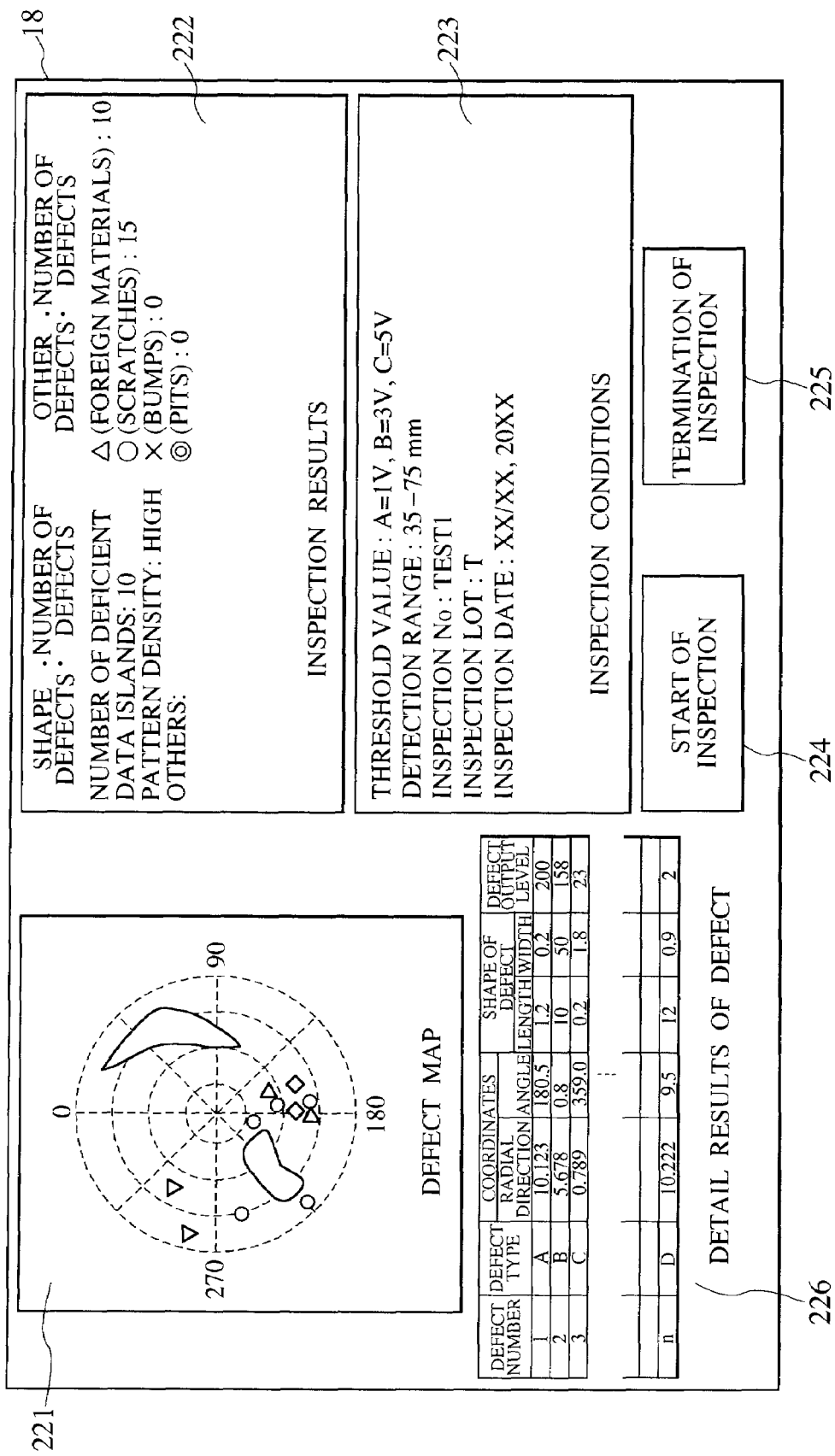
FIG. 15 is a diagram showing a display example of a monitor screen according to the first embodiment.

Next, an example of inputting inspection conditions is described below. The input operation is performed by means of the input device 17. The input results are displayed on the monitor 18. FIG. 15 shows an example of the display of a screen of the monitor 18. In FIG. 15, reference numeral 221 denotes a defect map display portion showing the upper surface of the medium, and reference numeral 222 denotes an inspection result display portion showing the type (shape defect or another defect) of a defect and the number of defects. The type of a defect and the number of defects can be shown in the defect map display portion 221 by using symbols.

Inspection conditions such as a threshold value, an inspection range, an inspection lot, the number of media, and whether or not the monitor display is performed, are input by means of the input device 17. The input data is displayed in an inspection condition display portion 223. A display portion 224 shows the start of the inspection, while a display portion 225 shows the termination of the inspection. An inspection result display portion 226 shows coordinates of a detected defect, a detection output level, the type of the detector and the like.

It is not necessary that the display portions show the data in the same screen. A part of the display portions may show the data in another screen. Partial enlargement, turning-off, real-time display and the like of each of the display portions can be freely set by means of the input device 17. The information displayed in the display portions can be printed by the printer 19.

Figure 16:
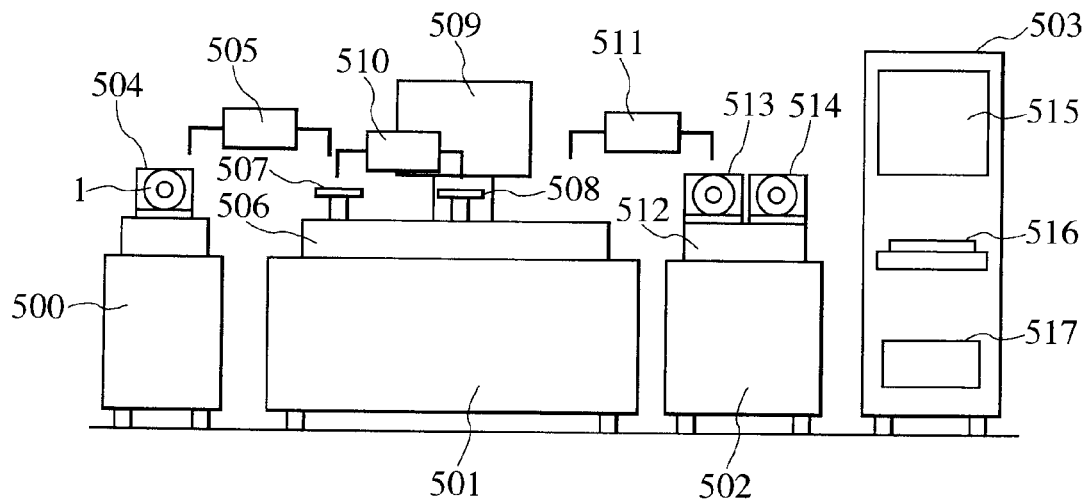
FIG. 16 is a diagram showing an inspection apparatus according to the first embodiment.

Next, an example of an apparatus using the inspection method according to the present invention is described below. FIG. 16 shows the example of the apparatus that automatically loads, inspects and unloads the medium. The apparatus includes a loader 500, an inspection station 501, an unloader 502, and a control system 503. The loader 500 is capable of mounting thereon a cartridge 504. The cartridge 504 is capable of accommodating a plurality of the media 1.

A transfer robot 505 is provided between the loader 500 and the inspection station 501. The transfer robot 505 extracts the media 1 one by one from the cartridge 504 placed on the loader 500 and rotates the media 1 90 degrees to transfer the media 1 to the inspection station 501. The inspection station 501 includes a translation stage 506, rotary stages 507, 508, an inspection head 509 and a medium reversal robot 510.

The transfer robot 502 places the medium 1 on the rotary stage 507. The medium 1 placed on the rotary stage 507 is moved to the inspection head 509 by the translation stage 506. The upper surface of the medium 1 is inspected by the inspection head 509. After the inspection, the medium reversal robot 510 reverses the medium 1 (180 degrees) and places the reversed medium 1 on the rotary stage to inspect the lower surface of the medium 1. The medium 1 of which the upper and lower surfaces are inspected is transferred to the unloader 502 by an unload robot 511.

Each of the two rotary stages 507 and 508 can be controlled to ensure that the medium 1 can be loaded on and unloaded from the rotary stage during the inspection. The unloader 502 is capable of mounting a plurality of cartridges thereon. When the media 1 need to be sorted into grades based on the inspection result, the unload robot 511 is controlled to sort the media 1 into cartridges 513 and 514. The control system 503 includes units for performing various controls, a monitor 515, an input device 516, and an output device (e.g., printer) 517.

Figure 17:
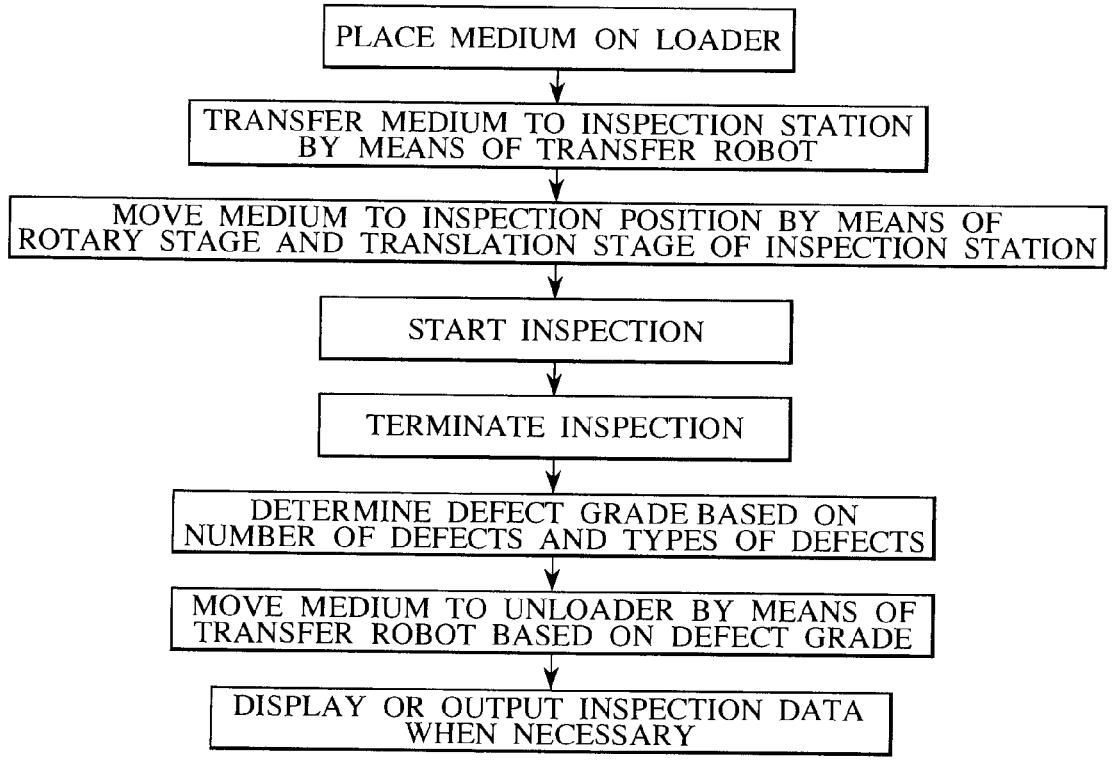
FIG. 17 is a flowchart of an inspection process performed by the inspection apparatus according to the first embodiment.

FIG. 17 is a flowchart of operations performed by the apparatus having the aforementioned configuration. First, the medium cartridge 504 is placed on the loader 500. The transfer robot 505 transfers the medium 1 to the inspection station 501. The medium 1 is moved to the inspection position by means of the translation and rotary stages of the inspection station 501. Then, both surfaces of the medium 1 are inspected. After the inspection, a defect grade is determined for the medium 1 based on the number of defects and the type of each of the defects. The unload robot 511 sorts the medium 1 into any of the cartridges based on the results of the defect grades. Then, the inspection is terminated. The inspection data is displayed or output when necessary.

The above example describes the media used in magnetic hard disk storage devices. A semiconductor wafer exhibits the same effect as the medium. In general, in a process for inspecting a data island arranged in a pattern on the surface of the semiconductor wafer, a foreign material, a scratch, or a shallow defect such as a water mark generated after cleaning may occur. It is expected that a process using a nano-imprint technique will be performed on semiconductor wafers. In this case, there is an effect to improve sensitivity of the inspection of the shape of a defect generated during the imprint process according to the present embodiment.

The same effect can be obtained as long as an object has a pattern with fine data islands that are successively arranged.

Second Embodiment

Figure 18:
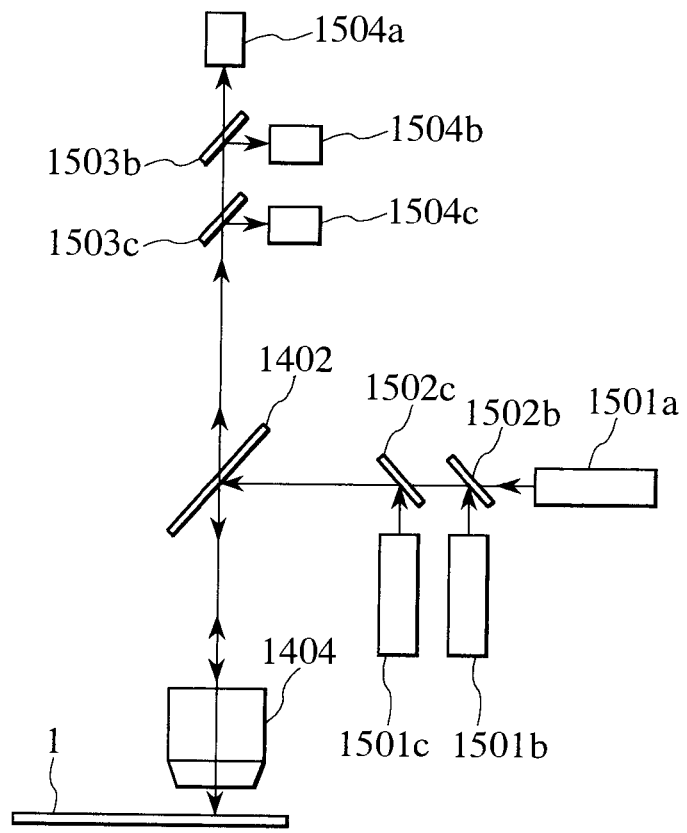
FIG. 18 is a configuration diagram showing a spectral detection system according to a second embodiment of the present invention.

The second embodiment of the present invention is described below with reference to FIG. 18. In the first embodiment, the light having the plurality of wavelengths is used for the spectral detection. For example, the following detection method is used. That is, a plurality of lasers 1501a, 1501b and 1501c emit laser beams having respective different wavelengths. Dichroic mirrors 1502b and 1502c cause the laser beams to propagate on the same optical axis. The laser beams passes through a half mirror 1402 and an objective lens 1404 and are incident on the upper surface of the medium 1. Then, the laser beams are reflected on the upper surface of the medium 1. Then, dichroic mirrors 1503b and 1503c separate the wavelengths of the light reflected on the medium 1. Detectors 1504a, 1504b and 1504c detect the separated wavelengths, respectively. FIG. 18 shows the case where the three lasers are used. In the second embodiment, the number of the discrete wavelengths is not limited to three.

Other configurations and processing are the same as those in the first embodiment, and the same effect as in the first embodiment can be obtained.

Third Embodiment

Figure 19:
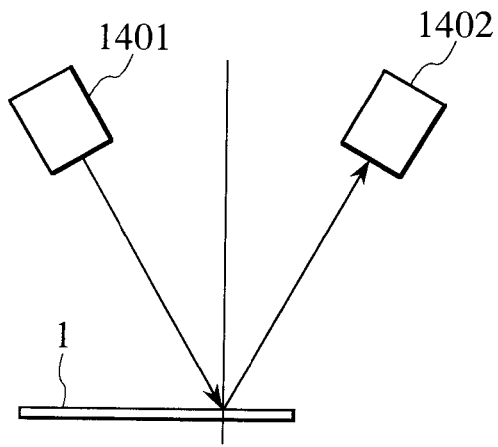
FIG. 19 is a configuration diagram showing a spectral detection system according to a third embodiment of the present invention.

The third embodiment of the present invention is described below with reference to FIG. 19. The first embodiment describes the method for illuminating the upper surface of the medium with the illumination light at the right angle and detecting the specularly reflected light. For example, a method for illuminating the upper surface of the medium with the light from an oblique direction with respect to the upper surface of the medium and detecting the specularly reflected light exhibits the same effect as the aforementioned method. Referring to FIG. 19, an illuminator 1401 illuminates the upper surface of the medium 1 from an oblique direction with respect to the upper surface of the medium 1. A spectrometer 1402 is placed in a direction in which the light emitted by the illuminator 1401 is specularly reflected.

In this method, the oblique illumination improves accuracy of inspection of a shape defect in some cases although it depends on the shape, structure and material of a target portion. In the case where the oblique illumination is performed, an illumination system and a detection system (for detecting scattered light) are placed in directions in which the systems are not affected by the oblique illumination. Other configurations and processing are the same as those in the first embodiment, and the same effect as in the first embodiment can be obtained.

According to the present invention, the medium is illuminated with the light having the plurality of wavelengths. The intensity of the light reflected on the medium is detected for each wavelength. The detection device determines whether or not a data island arranged in the pattern on the medium is present or whether or not the shape of the data island is good based on the detected data. Thus, the shape of the data island arranged in the pattern on the surface of the medium can be inspected. In addition, the medium is illuminated with the laser light. The light scattered from the medium (illuminated with the laser light) at the first elevation angle and the light scattered from the medium (illuminated with the laser light) at the second elevation angle are detected by the detectors. Based on the signal obtained by the detection of the light scattered from the surface of the medium at the first elevation angle and the signal obtained by the detection of the light scattered from the surface of the medium at the second elevation angle, a foreign material or scratch present on the medium can be detected. The light components are detected from the same region in the same process. Thus, the detection device can determine the shape of a data island arranged in the pattern on the surface of the medium and determine whether a foreign material or a scratch is present on the medium. The present invention provides a remarkable effect to reliably inspect the shape of a data island arranged in the pattern on the surface of the medium by removing a foreign material or eliminating a scratch based on the result of the inspection of the shape of the data island.

The present invention provides the method and device for optically detecting a shape defect on the surface of a magnetic medium, semiconductor wafer or the like. The method and the device according to the present invention are used to determine whether or not a data island that is arranged in the pattern formed on the surface of the medium and is finer than optical resolution is present and to detect a foreign material or a scratch on the surface of the medium from the same region in the same process by means of the detectors. Thus, a defect such as the foreign material or scratch can be removed or eliminated based on the inspection results including whether or not a data island is present and whether or not the shape of the data island is good. Therefore, the detection device is capable of determining whether or not a data island is present and whether or not the shape of the data island is good with high sensitivity and outputting or displaying the results.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method for detecting the shape of a surface of a substrate having a pattern, comprising the steps of:
    illuminating a portion of the surface of the substrate rotating and moving in a single axial direction with light having a plurality of wavelengths, detecting an intensity of light reflected on the surface of the substrate for each wavelength, and detecting whether or not a data island arranged in the pattern is present on the illuminated portion of the surface of the substrate or whether or not the shape of the data island is good based on data on the detected intensities;
    illuminating the portion of the surface of the substrate with laser light, detecting light scattered at a first elevation angle with respect to the surface of the substrate and from the portion of the surface of the substrate illuminated with the laser light, and light scattered at a second elevation angle with respect to the surface of the substrate and from the portion of the surface of the substrate illuminated with the laser light, to obtain a first scattered light detection signal based on the light scattered at the first elevation angle, and to obtain a second scattered light detection signal based on the light scattered at the second elevation angle, processing the first and second scattered light detection signals, and detecting a defect causing the light to be scattered and present on the portion of the surface of the substrate;
    processing coordinates of the defect and information indicating the defect based on the result obtained in the step of detecting whether or not the data island is present on the illuminated portion of the surface of the substrate or whether or not the shape of the data island is good;
    processing coordinates of the defect and information indicating the defect based on the result obtained in the step of detecting the defect causing the light to be scattered;
    comparing the sets of the coordinates with each other to confirm whether or not the sets of the coordinates match each other; and
    removing information that indicates a defect whose coordinates match coordinates obtained in the step of detecting the defect causing the light to be scattered, wherein the processing result of the information obtained in the step of detecting whether or not the data island is present on the illuminated portion of the surface of the substrate or whether or not the shape of the data island is good is combined with the processed result of the information obtained in the step of detecting the defect causing the light to be scattered to detect the defect as an actual defect present on the surface of the substrate.

2. The method according to claim 1,
    wherein in the step of illuminating the surface of the substrate with the light having the plurality of wavelengths, a spectral waveform is detected from the surface of the substrate by illuminating the surface of the substrate from an upper side of the substrate and detecting light reflected on the surface of the substrate, and
    in the step of illuminating the surface of the substrate with the laser light, the surface of the substrate is illuminated at the first elevation angle.

3. The method according to claim 1,
    wherein a single region of the surface of the substrate is illuminated with the light having the plurality of wavelengths and with the laser light in a single process, and
    a detection of light reflected on the surface of the substrate by the illumination with the light having the plurality of wavelengths and a detection of light scattered from the surface of the substrate by the illumination with the laser light are performed in a single process.

4. The method according to claim 1,
    wherein in the step of detecting the spectral waveform from the surface of the substrate, a reference spectral waveform and the detected spectral waveform are processed to detect a difference between the reference spectral waveform and the detected spectral waveform, and
    in the step of detecting the difference between the spectral waveforms, whether or not the data island is present or whether or not the shape of the data island is good is determined based on the difference to classify the defect present on the surface of the substrate into a foreign material or a scratch and thereby detect the defect.

5. The method according to claim 1,
    wherein the first and second scattered light detection signals are processed to classify the defect present on the surface of the substrate into a foreign material or a scratch and thereby detect the defect.

6. A device for detecting the shape of a surface of a substrate, comprising:
    a table for mounting the substrate, rotating the substrate and moving the substrate in a single axial direction;

a first illuminator for illuminating, with light having a plurality of wavelengths, the surface of the substrate mounted on the table and rotating and moving in the single axial direction;

a second illuminator for illuminating the surface of the substrate with laser light from an oblique direction with respect to the surface of the substrate;

a reflected light detector for detecting the intensity of the light reflected on the substrate illuminated by the first illuminator;

a first scattered light detector for detecting light scattered at a first elevation angle with respect to the surface of the substrate and from the substrate illuminated with the laser light by the second illuminator;

a second scattered light detector for detecting light scattered at a second elevation angle with respect to the surface of the substrate and from the substrate illuminated with the laser light by the second illuminator;

a spectral waveform processing unit for processing information indicating a defect present on the surface of the substrate and received from the reflected light detector for detecting the intensity of the reflected light;

a scattered light processing unit for processing detection signals received from the first and second scattered light detectors and detecting the defect on the surface of the substrate;

a defect information processing unit for extracting information received from the spectral waveform processing unit, from information obtained from the result of the processing performed by the spectral waveform processing unit and information received from the scattered light processing unit;

a monitor for displaying the information indicating the defect and received from the defect information processing unit; and a storage unit for storing the information indicating the defect and received from the defect information processing unit, wherein the spectral waveform processing unit detects the shape of the surface of the substrate, the scattered light processing unit detects the defect on the surface of the substrate, the defect information processing unit only extracts the information indicating the defect present on the surface of the substrate, the monitor displays the information indicating the defect based on the information extracted by the defect information processing unit, and the storage unit stores the information indicating the defect.

7. The device according to claim 6,
wherein the first illuminator illuminates the surface of the substrate from an upper side of the substrate with light having a plurality of wavelengths,
the reflected light detector detects light reflected on the surface of the substrate illuminated with the light having the plurality of wavelengths, and
the second illuminator illuminates the surface of the substrate with the laser light at a first elevation angle with respect to the surface of the substrate.

8. The device according to claim 6,
wherein the reflected light detector is a spectrometer for detecting a spectral waveform of light reflected on the surface of the substrate.

9. The device according to claim 6,
wherein a single region of the surface of the substrate is illuminated with the light having the plurality of wavelengths and with the laser light in a single process, and
the detection of the light reflected on the surface of the substrate by the illumination with the light having the plurality of wavelengths and the detection of the light scattered from the surface of the substrate by the illumination with the laser light are performed in a single process.

10. The device according to claim 8, further comprising a unit for determining whether or not a data island arranged in a pattern is present on the surface of the substrate or whether or not the shape of the data island is good based on a difference between the spectral waveform received from the spectrometer and a reference spectral waveform, the difference detected by processing the spectral waveform received from the spectrometer and the reference spectral waveform by means of the spectral waveform processing unit.

11. The device according to claim 6,
wherein a signal generated by the first scattered light detector and a signal generated by the second scattered light detector are processed to classify the defect on the surface of the substrate into a foreign material or a scratch and thereby detect the defect.

12. The device according to claim 6, further comprising an input device for inputting inspection conditions including a reference spectral waveform, a threshold value, an inspection range, an inspection lot, the number of media, and whether or not display is performed by the monitor,
wherein the monitor displays the inspection conditions and detection results including coordinates of the detected defect and a detection output level.

13. The device according to claim 6,
wherein the substrate is a medium used in a magnetic hard disk storage device or is a semiconductor wafer.

* * * * *